United States Patent
Hiraguchi

(10) Patent No.: US 7,055,773 B2
(45) Date of Patent: Jun. 6, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/465,610

(22) Filed: Jun. 20, 2003

(65) Prior Publication Data

US 2003/0234308 A1 Dec. 25, 2003

(30) Foreign Application Priority Data

Jun. 20, 2002 (JP) ............................. 2002-180040

(51) Int. Cl.
 *G11B 23/107* (2006.01)
(52) U.S. Cl. .................. 242/348.2; 242/338; 360/132
(58) Field of Classification Search ................. 242/348, 242/348.2, 338; 360/132
See application file for complete search history.

(56) References Cited

U.S. PATENT DOCUMENTS

| | | | |
|---|---|---|---|
| 3,861,611 A * | 1/1975 | Esashi et al. ............. 242/326.2 |
| 5,706,146 A * | 1/1998 | Ono et al. .................... 360/94 |
| 6,349,892 B1 | 2/2002 | Tsuyuki et al. |
| 6,435,439 B1 | 8/2002 | Ishihara |
| 6,581,865 B1 | 6/2003 | Zweighaft |
| 6,764,037 B1 * | 7/2004 | Hancock et al. ............. 242/348 |
| 2003/0080228 A1 * | 5/2003 | Hiraguchi et al. ........ 242/348.2 |
| 2003/0094528 A1 * | 5/2003 | Hiraguchi ................... 242/348 |
| 2003/0094530 A1 * | 5/2003 | Hiraguchi ................ 242/348.2 |
| 2003/0178519 A1 | 9/2003 | Hancock |
| 2003/0234309 A1 | 12/2003 | Hiraguchi |
| 2004/0011909 A1 | 1/2004 | Ishihara |
| 2004/0041053 A1 | 3/2004 | Iino |
| 2004/0050991 A1 * | 3/2004 | Hiraguchi ................ 242/348.2 |
| 2004/0061016 A1 | 4/2004 | Morita |
| 2004/0061017 A1 | 4/2004 | Hiraguchi |
| 2004/0089757 A1 | 5/2004 | Ishihara |

FOREIGN PATENT DOCUMENTS

| | | |
|---|---|---|
| JP | 2000-076821 A | 3/2000 |
| JP | 2001-148179 A | 5/2001 |

* cited by examiner

*Primary Examiner*—John Q. Nguyen
(74) *Attorney, Agent, or Firm*—Sughrue Mion, PLLC

(57) ABSTRACT

A recording tape cartridge which can lead to smaller drive devices. The recording tape cartridge includes a case, an opening, a covering member and guide grooves. The case is substantially rectangular and rotatably accommodates a single reel on which recording tape is wound. The opening is provided by cutting away a corner portion at a drive device loading side of the case. The opening is for drawing out a leader member to which an end portion of the tape is attached. The covering member is provided inside the case and is formed in a substantially circular arc shape in plan view. The covering member moves along a predetermined circular circumference to open and close the opening. The guide grooves are provided at inner faces of the case and guide the covering member. End portions of groove walls of the guide grooves that face leader member exit/entry openings are chamfered.

21 Claims, 9 Drawing Sheets

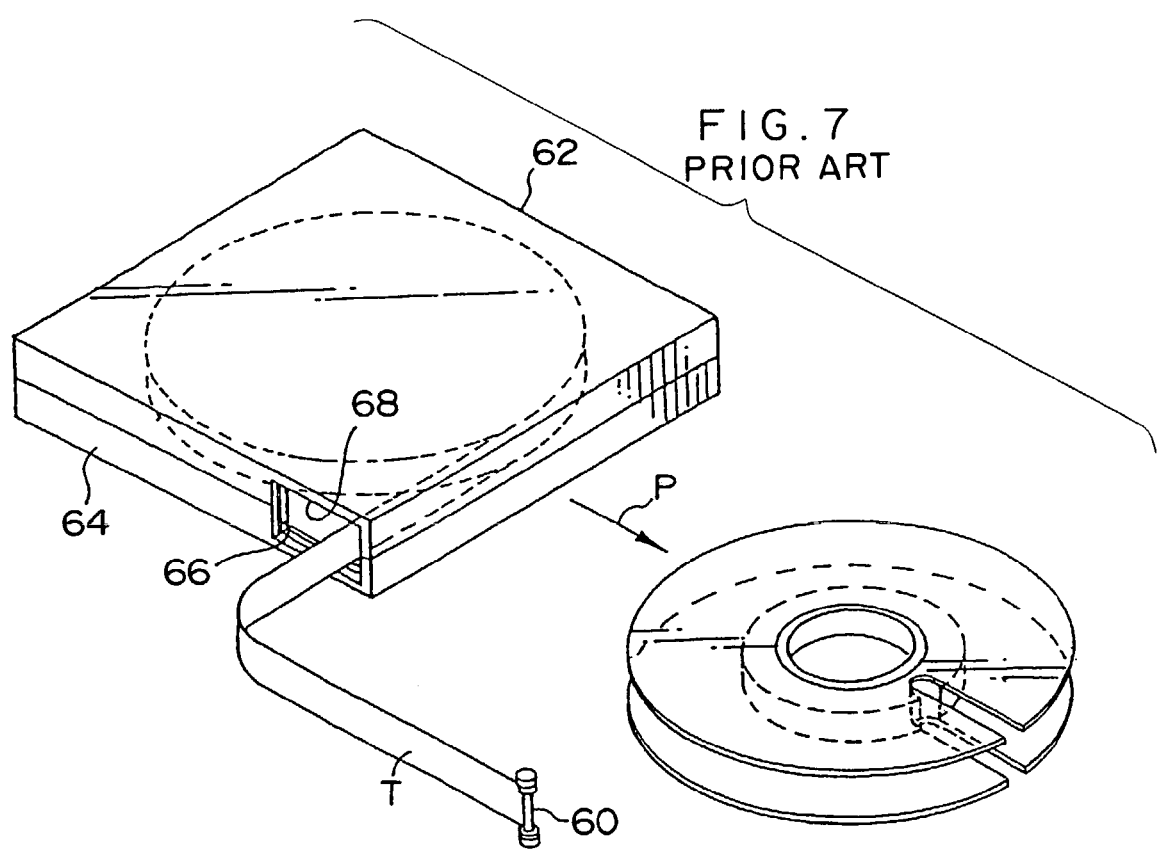

RECORDING TAPE CARTRIDGE

CROSS-REFERENCE TO RELATED APPLICATION

This application claims priority under 35USC 119 from Japanese Patent Application No. 2002-180040, the disclosure of which is incorporated by reference herein.

BACKGROUND OF THE INVENTION

1. Field of the Invention

The present invention relates to a recording tape cartridge which accommodates, in a case, a single reel onto which recording tape such as a magnetic tape or the like is wound, principally for use as a recording/replaying medium for computers and the like.

2. Description of the Related Art

Conventionally, a magnetic tape cartridge has been known in which a magnetic tape, which is used as a data recording/replaying medium for computers or the like, is wound onto a single reel and this reel is accommodated in a case. At a distal end of such a magnetic tape, a leader member, such as a leader pin, a leader tape, a leader block or the like is provided. Drawing-out means, which is provided at a drive device side, draws the leader member out through an opening aperture of the magnetic tape cartridge and winds the magnetic tape, which is fixed to the leader member, onto a drive device side winding reel.

A reel gear is provided in an annular form at a lower face center of the reel and exposed through an opening hole, which is formed in a lower face of the magnetic tape cartridge. A drive gear, which is provided at a drive device side rotation shaft, meshes with the reel gear. By this structure, the reel is driven to rotate. When the reel of the magnetic tape cartridge and the winding reel of the drive device are rotated at the same time, data can be recorded to the magnetic tape and/or data that has been recorded to the magnetic tape can be replayed.

Such magnetic tape cartridges take up little space when stored and can record large amounts of information. As shown in FIGS. 7 to 9, a position of the opening aperture and a type of door that opens and closes the opening aperture are different for the different types of leader member. Specifically, in the case of a leader pin 60, as shown in FIG. 7, an opening 68 is formed in a side wall 64 of a case 62, which wall is parallel with a direction of loading into a drive device (the direction of arrow P). This opening 68 is opened and closed by a door 66, which slidingly moves in a direction the same as the loading direction.

However, because the opening 68 is provided at the side wall 64 of the case 62 in this manner, it is necessary that the drive device side drawing-out means turns and guides in the leader pin 60 from a sideward direction left or right of the case 62 when drawing out the leader pin 60. Therefore, a space for this turning and guiding in by the drawing-out means must be conserved at the drive device side. Moreover, a structure for the turning and guiding in by the drawing-out means is complicated, and leads to a disadvantageous increase in size of the drive device. In addition, there is a problem that a drawing-out path of the magnetic tape T becomes long.

In the case of a leader tape 70, as shown in FIG. 8, an opening 78 is formed in a front wall 74 of a case 72, which wall intersects the direction of loading into a drive device (the direction of arrow P). A door 76, which opens and closes this opening 78, is a swivel-type door which rotates forward about a support shaft 75 which is supported at a corner vicinity of the case 72. However, when the opening 78 is formed in the front wall 74 of the case 72 in this manner, although there is no requirement for the drive device side drawing-out means to turn and guide in the tape, the door 76 opens outward by a large amount. Therefore, it is necessary to reserve space at the drive device side such that the door 76 will not be impeded when opening the opening 78. As a result, the drive device disadvantageously becomes larger.

In the case of a leader block 80, as shown in FIG. 9, an opening 88 is formed by cutting away a corner portion 84 at a front side in the drive device loading direction. The opening 88 is opened and closed directly by the leader block 80. When the leader block 80 opens and closes the opening 88 in this manner, there is a problem in that the leader block 80 is susceptible to the occurrence of damage and soiling. Specifically, because the leader block 80 engages at a drive device side reel hub 86 and structures a portion of the reel hub 86, even a small amount of damage or soiling that would not be a problem if the leader block 80 was employed as a usual door can cause difficulty for engaging with the reel hub 86, and this can have a disadvantageous effect on running of the magnetic tape T.

Moreover, the leader block 80 is anchored only at peripheral portions of the opening 88. Consequently, there is a problem that the leader block 80 detaches easily when the magnetic tape cartridge is dropped. Furthermore, because the leader block 80 is larger in size than the leader pin 60, there is a problem in that there are many more constraints on the form of the case. Therefore, the leader pin 60, which functions separately from a door, can be said to be preferable to the leader block 80, which is combined with a door.

SUMMARY OF THE INVENTION

An object of the present invention is to provide a recording tape cartridge in which a door, which is for opening and closing an opening aperture, and a leader member, which is for drawing out of a recording tape, are separate members, the opening aperture is provided such that a drawing out path of the recording tape is as short as possible, the door is provided as a sliding-type door which is capable of opening and closing the opening aperture in a small space, and with which a drive device can be designed to be small.

In order to achieve the object described above, according to a first aspect of the present invention, there is provided a tape cartridge which is insertable at a tape drive is provided, the tape drive being provided with an opening member which is operably engageable with the tape cartridge at a time of insertion of the tape cartridge and carrying out at least one of reading and writing of data, and the tape cartridge including: a case; a tape access opening formed in the case; a covering member which is reciprocally moveable along a circular arc-form movement path between a closed position for closing the tape access opening and an open position for opening the tape access opening; and a plurality of guide portions for guiding the reciprocal movement of the covering member, wherein chamfering is applied to form a taper surface at an end portion of at least one guide portion of the plurality of guide portions, which end portion faces the tape access opening, for smooth guiding of the covering member.

According to another aspect of the present invention, there is provided a tape drive for carrying out at least one of reading and writing of data at a tape cartridge which is insertable at the tape drive is provided, the tape cartridge including: a case; a tape access opening formed in the case;

a covering member which is reciprocally moveable along a circular arc-form movement path between a closed position for closing the tape access opening and an open position for opening the tape access opening; and a plurality of guide portions for guiding the reciprocal movement of the covering member, chamfering being applied to form a taper surface at an end portion of at least one guide portion of the plurality of guide portions, which end portion faces the tape access opening, for smooth guiding of the covering member, and the tape drive including an opening member which is capable of operably engaging with the tape cartridge at a time of insertion of the tape cartridge.

BRIEF DESCRIPTION OF THE DRAWINGS

FIG. 7 is a schematic perspective view of a conventional magnetic tape cartridge provided with a leader pin.

DETAILED DESCRIPTION OF THE PREFERRED EMBODIMENT

Herebelow, a recording tape cartridge 10 relating to an embodiment of the present invention will be described on the basis of FIGS. 1 to 5. First, overall structure of the recording tape cartridge 10 will be briefly described, and then principal elements relating to the present invention will be described in detail. For convenience of explanation, a loading direction of the recording tape cartridge 10 into a drive device is shown as arrow A, and is regarded as a forward direction (front side) of the recording tape cartridge 10. The direction of an arrow B intersecting arrow A is regarded as a rightward direction.

Figure 1:
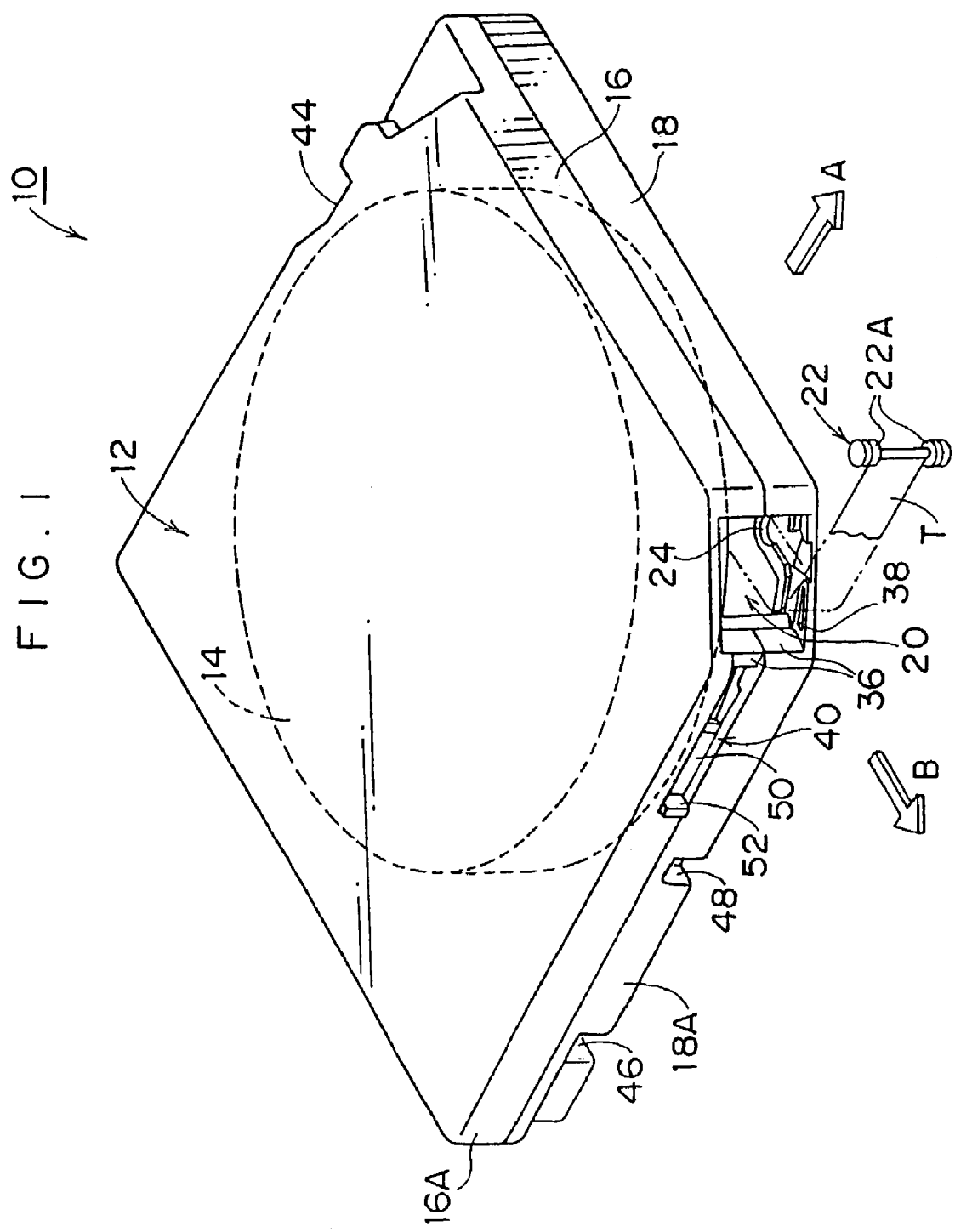
FIG. 1 is a schematic perspective view of a recording tape cartridge.
Figure 2:
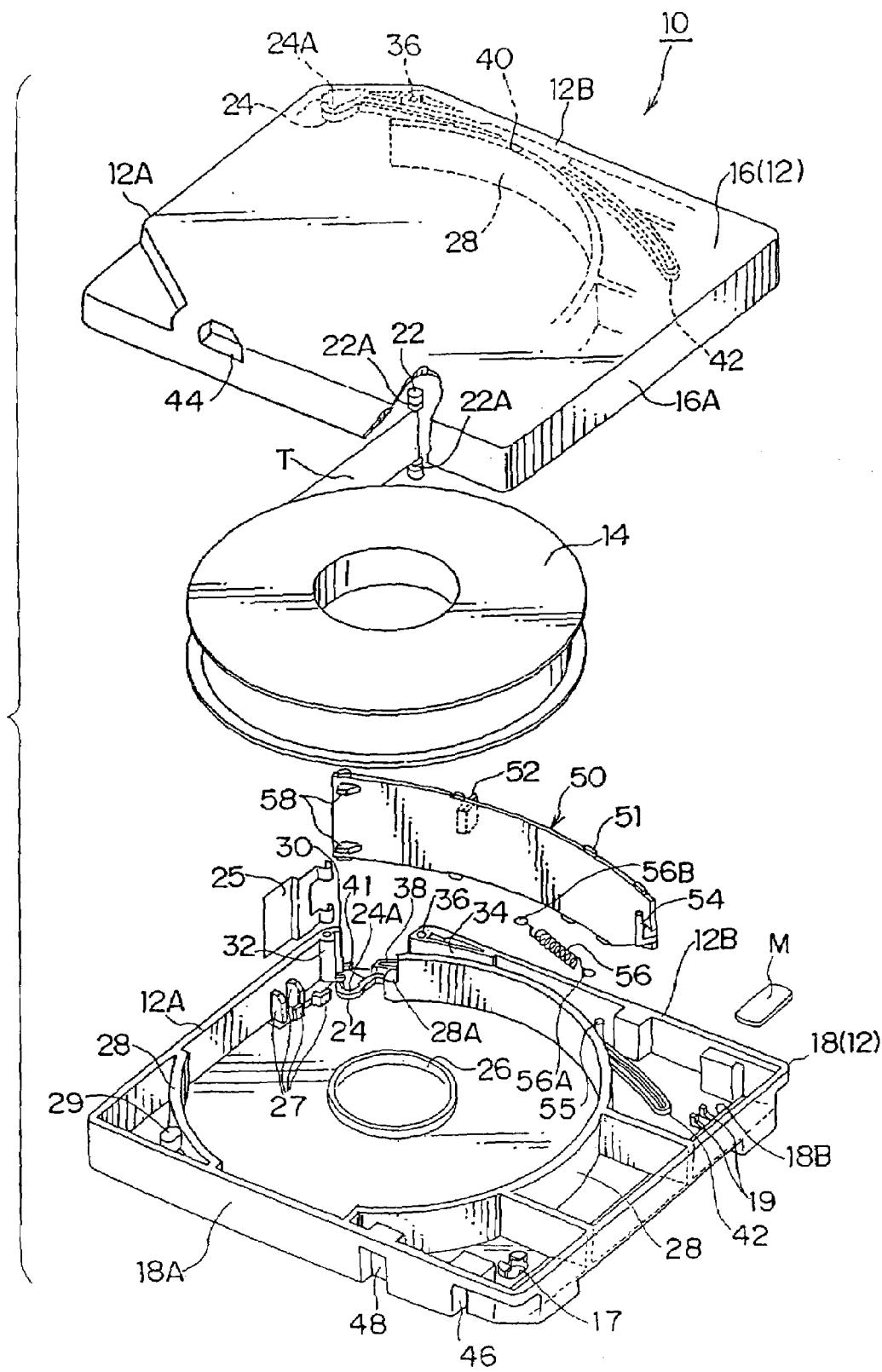
FIG. 2 is a schematic exploded perspective view of the recording tape cartridge.

As shown in FIGS. 1 and 2, the recording tape cartridge 10 is structured to rotatably accommodate a single reel 14 in a case 12. The case 12 is substantially rectangular in plan view. A magnetic tape T is wound on the reel 14. The magnetic tape T serves as a recording tape which is an information recording/replaying medium. The case 12 is structured by matching up and joining a pair of peripheral walls 16A and 18A, of an upper case 16 and a lower case 18, to one another. A front-right corner portion of each of the upper case 16 and the lower case 18, which is a single corner portion at a leading side in the direction of loading into the drive device, has a diagonally cut-away form. An accommodation space for the reel 14 onto which the magnetic tape T is wound is provided inside the case 12.

The cut-away corner portions of the peripheral walls 16A and 18A of the upper case 16 and lower case 18 serve as an opening 20 for drawing out the magnetic tape T. A leader pin 22 is connected at a free end of the magnetic tape T, which is to be drawn out through the opening 20. The leader pin 22 is caught on (engaged) by drawing-out means of the drive device and subjected to a drawing-out operation. At each of two end portions of the leader pin 22, which protrude beyond width direction end portions of the magnetic tape T, an annular groove 22A is formed. These annular grooves 22A are caught on by hooks or the like of the drawing-out means. Thus, with this structure, the hooks or the like do not contact and damage the magnetic tape T when the magnetic tape T is being drawn out.

Figure 3:
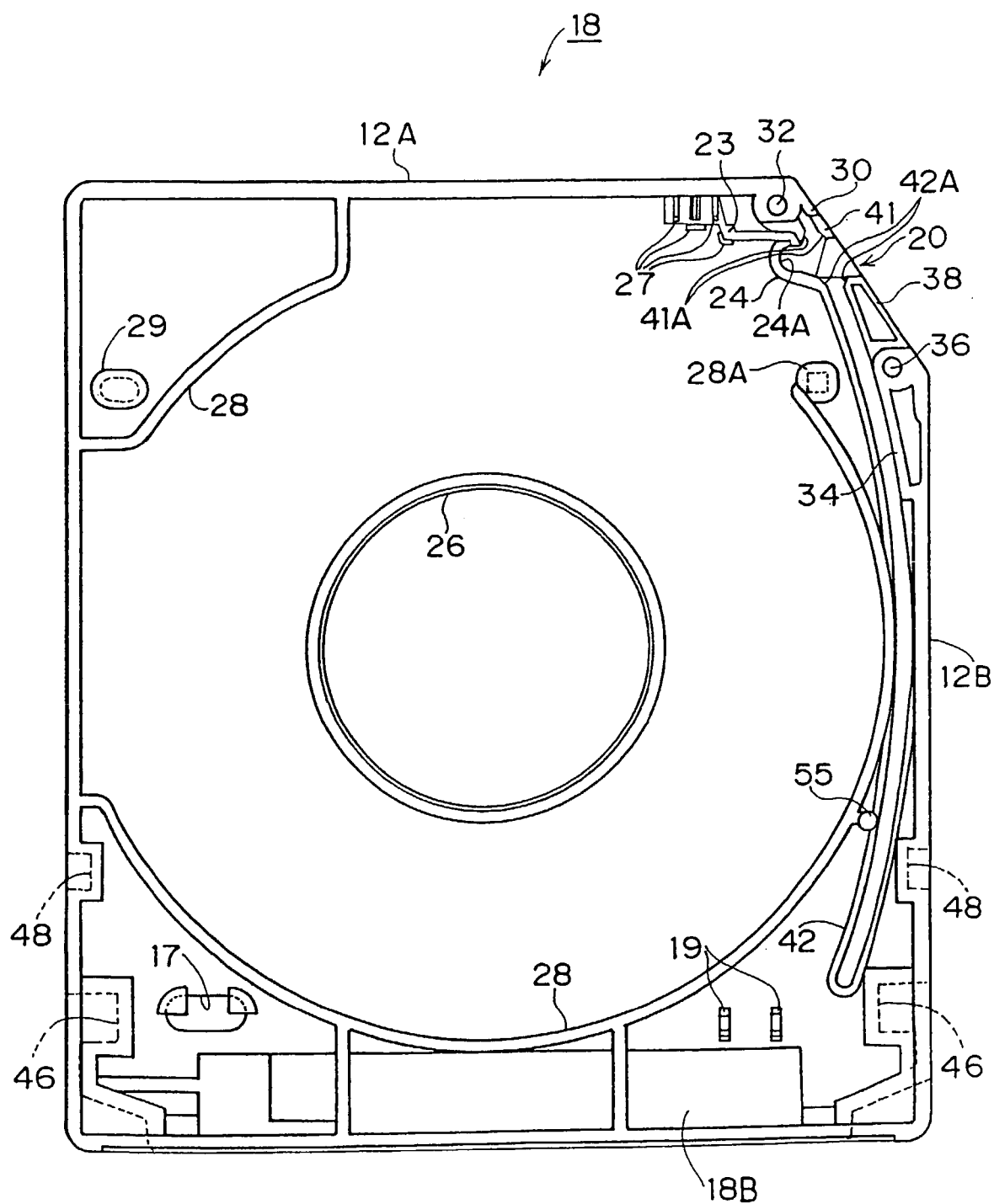
FIG. 3 is a schematic plan view of a lower case.
Figure 4:
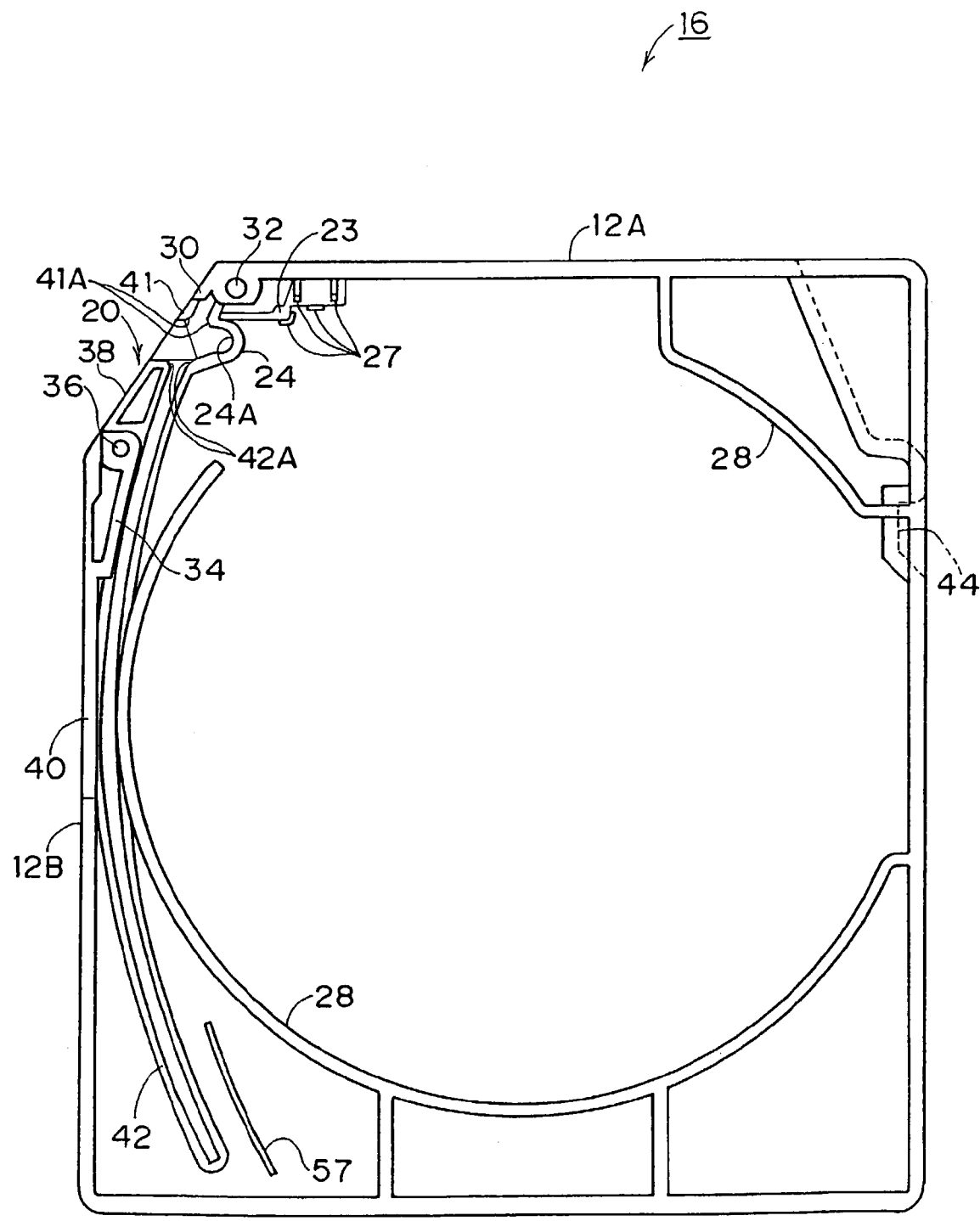
FIG. 4 is a schematic plan view of an upper case.

At an inner side of the opening 20 of the case 12, a pair of upper and lower pin retention portions 24 are provided for positioning and retaining the leader pin 22 in the case 12. The pin retention portions 24 have semi-tubular forms, as shown in FIGS. 3 and 4, and the two end portions of the leader pin 22 are held in recess portions 24A of the pin retention portions 24 in a state in which the leader pin 22 is standing thereat. Outer peripheral walls of the pin retention portions 24 are open at a magnetic tape T drawing out side thereof, to form exit/entry apertures through which the leader pin 22 is removed and inserted.

A base portion of a leaf spring 25 is inserted at a groove portion 23 (see FIGS. 3 and 4) and a spring retention portion 27 is provided at an inner face of a front wall 12A (a portion of the peripheral walls 16A and 18A whose outer surface faces in the direction of arrow A). Thus, the leaf spring 25 is fixedly disposed in a vicinity of the pin retention portions 24. Distal end portions of a bifurcated form of the leaf spring 25 engage with upper and lower ends of the leader pin 22, and hold the leader pin 22 at the pin retention portions 24. The distal end portions of the leaf spring 25 are structured to resiliently deform appropriately when the leader pin 22 is removed or inserted at the pin retention portions 24, to allow such movements of the leader pin 22.

A gear aperture 26 is formed at a central portion of the lower case 18. The gear aperture 26 is for exposing an unillustrated reel gear of the reel 14 to the outside. The reel gear meshes with a driving gear of a drive device and the reel 14 is driven to rotate inside the case 12. The reel 14 is held by free play-restricting walls 28 so as not to rattle about. The free play-restricting walls 28 are provided projecting at portions of interior surfaces of the upper case 16 and the lower case 18, to serve as interior walls along a circular path which is coaxial with the gear aperture 26.

A hollow portion 28A is provided continuously with an end portion of the free play-restricting walls 28 in a vicinity of the opening 20. A hole is formed in the hollow portion 28A for regulation of position at the interior thereof. Further, a hollow portion 29 is provided separately from the free play-restricting walls 28 at an inner side of a front-left corner portion of the case 12. Another hole for regulation of position, which is a long hole, is formed in the hollow portion 29. The hollow portion 28A and the hollow portion 29 are disposed co-linearly along the direction of arrow B. Except for the end portion at which the hollow portion 28A is continuously provided, each of the free play-restricting walls 28 is provided continuously with the peripheral wall 16A or the peripheral wall 18A of the case 12. Accordingly, outer sides of the free play-restricting walls 28 and the space for disposing the reel 14 are set apart.

A memory board M is disposed at a rear-right portion of the lower case 18. The memory board M stores various kinds of information for each individual recording tape cartridge 10. A rear portion inside wall 18B is formed at an inclined face at a predetermined angle, the memory board M is supported by support protrusions 19, and the memory board M is inclinedly disposed at the predetermined angle. Thus, the memory board M is inclined such that the memory board M can be detected at a drive device, which reads the memory board M from a lower face side, and a library apparatus, which reads the memory board M from a rear face side. A write-protect portion (not shown), which sets whether recording to the recording tape cartridge 10 is allowed or disallowed, is provided at a rear-left portion of the lower case 18. An opening hole 17, through which an operation protrusion (not shown) for operating the write-protect portion protrudes, is piercingly provided through the rear-left portion of the lower case 18.

A pair of short upper and lower angled wall portions 30 is provided at a right end portion of the front wall 12A of the case 12. The angled wall portions 30 are inflectedly formed along an opening face of the opening 20. When the opening 20 is closed off, a distal end of a door 50 with a substantially circular arc form in plan view, which is described later, enters into an inner side of the angled wall portions 30. Hence, the angled wall portions 30 act as an anti-dust wall such that a gap through which dust and the like could ingress does not occur. A pair of upper and lower screw bosses 32 are continuously provided at an inner side of the front wall 12A, at a vicinity of a left end of the angled wall portions 30.

A pair of upper and lower angled wall portions 34 is provided at an inner side of a front end portion of a right wall 12B of the case 12 (a portion of the peripheral walls 16A and 18A whose outer surface faces in the direction of arrow B). The angled wall portions 34 are formed, in plan view, substantially along an outer peripheral face of the door 50. Front end faces of the angled wall portions 34 define a rear edge of the opening 20, and a pair of upper and lower screw bosses 36 are provided at a front end portion of the angled wall portions 34.

A slit 40 is formed in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by cutting away a front side lower portion of the peripheral wall 16A of the upper case 16 structuring the right wall 12B. The slit 40 also opens to the opening 20 side thereof. It is preferable if the slit 40 is formed with a portion of the peripheral wall 16A remaining at an upper side thereof, in order that rigidity of the case 12 can be maintained. In particular, it is even more preferable if the upper side wall defining the slit 40 is continuously provided to be integral with the angled wall portion 34.

A recess portion 48 is formed at a rearward side of the lower case 18. The recess portion 48 is recessed, with a three-sided box shape in cross-sectional view, toward the inside of the case 12 at a portion of the peripheral wall 18A which does not include an upper end of the peripheral wall 18A, and is recessed upward from a lower face of the case 12 (i.e., a floor plate is cut away). The recess portion 48 is also formed at a left wall of the case 12. These recess portions 48 serve as, for example, engaging portions for engaging with pulling-in means of the drive device, with bottom surfaces of the recess portions 48 (surfaces that face downward) serving as reference surfaces for positioning in the drive device.

Further, a recess portion 46 is formed at the left wall at a rearward side of the recess portion 48. The recess portion 46 is recessed, with a three-sided box shape in cross-sectional view, toward the inside of the case 12 at a portion of the peripheral wall 18A which does not include an upper end of the peripheral wall 18A, and is recessed upward from the lower face of the case 12 (i.e., the floor plate is cut away). The recess portion 46 serves as an engagement portion which is engaged by grasping means of the library apparatus. Because these recess portions 46 and 48 are provided, twisting strength of the case 12 (the lower case 18) is improved. Further still, a recess portion 44, which has a substantially trapezoid form in plan view, is formed at an upper face portion of a left wall of the upper case 16. The recess portion 44 serves as an engaging portion at which a holding member (not shown) engages for canceling out rotational torque when the door 50 moves in an opening direction, when the opening 20 is to be opened.

Guide wall portions 42 are provided standing from the upper case 16 and lower case 18 to predetermined heights (for example, around 1.0 mm to 1.5 mm) so as to sandwich protrusion portions 51 of the later-described door 50 from an inner face side and an outer face side thereof. The guide wall portions 42 are provided from a vicinity of the opening 20 to a vicinity of a portion of the free play-restricting walls 28 that is closest to the right wall 12B (below referred to as a "front half" of the guide wall portions 42), and from a vicinity of a rear end of the slit 40 to a vicinity of the rear wall (below referred to as a "rear half" of the guide wall portions 42).

The guide wall portions 42 are formed in substantially circular arc shapes in plan view, and a length of the guide wall portions 42 at the upper case 16 is different from a length of the guide wall portions 42 at the lower case 18. That is, the guide wall portions 42 of the upper case 16 are formed to be longer at the rear half side than the guide wall portions 42 of the lower case 18. This is because the memory board M is disposed to be inclined at the predetermined angle at the right wall 12B side of the rear portion inside wall 18B.

Rear end portions of the rear half of the guide wall portions 42 are closed off in substantially circular arc shapes, in plan view, and act to restrict the rearmost of the upper and lower protrusion portions 51 such that the door 50 cannot move rearward therebeyond. Front end portions of the front half of the guide wall portions 42 are open, and are provided extending to positions such that the guide wall portions 42 do not interfere with entry or removal of the leader pin 22 at times of exit/entry of the leader pin 22 (i.e., in the drawings, at a side rearward relative to the pin retention portions 24, around half way along the opening width of the opening 20).

At a vicinity of the angled wall portions 30, guide wall portions 41 are standingly provided so as to be located on lines extending from the guide wall portions 42, and rear end portions of the guide wall portions 41 are open. These guide wall portions 41 are provided extending to a side rearward relative to a front end of the pin retention portions 24, such that rear end portions of the guide wall portions 41 do not interfere with entry or removal of the leader pin 22. A spacing (groove width) of the guide wall portions 41 is slightly narrower than a spacing (groove width) of the guide wall portions 42.

Here, the spacing (groove width) of the guide wall portions 42 is formed to be slightly wide in order to allow for variations in molding of the door 50 (variations in a rate of curvature thereof), and the protrusion portions 51 of the door 50 slide in the guide wall portions 42 in a state in which the protrusion portions 51 have a certain amount of looseness. Accordingly, at least the spacing (groove width) of the guide wall portions 41 is set to a size substantially the same as a width of the protrusion portions 51 of the door 50 (a width which includes protrusions 51A, which are described later). Thus, when the opening 20 is closed, because the frontmost of the protrusion portions 51 are fitted into the guide wall portions 41, the door 50 can be retained without looseness.

The guide wall portions 41 and the front half of the guide wall portions 42 are formed to be slightly lower in height than the rear half of the guide wall portions 42. For example, a height of the guide wall portions 41 and the front half of the guide wall portions 42 may be formed to be about 1 mm and a height of the rear half of the guide wall portions 42 may be formed to be about 1.5 mm. The purpose of this is to maintain space for insertion of the drive device side drawing-out means, for chucking and drawing out the leader pin 22. Accordingly, as described later, a plate breadth (height) of the door 50 at a front half portion thereof (at least a portion that closes the opening 20) is formed to be larger (higher) in correspondence with the amount by which the guide wall portions 41 and the front half of the guide wall portions 42 are lower.

Ribs 38 are standingly provided at inner faces of the upper case 16 and the lower case 18. The ribs 38 form substantially trapezoid shapes in plan view and are integral with the outer side guide wall portions 42 that are exposed through the opening 20. The ribs 38 are provided to have substantially the same heights as the guide wall portions 42. Strengths of the upper case 16 and the lower case 18 at a portion of the opening 20 are preserved by the ribs 38. The guide wall portions 42 are continuously provided to be integral with the pin retention portions 24. It is desirable if the heights of the pin retention portions 24 are substantially equal to or higher than the heights of the guide wall portions 42 that are integrally provided continuously therewith.

Figure 5:
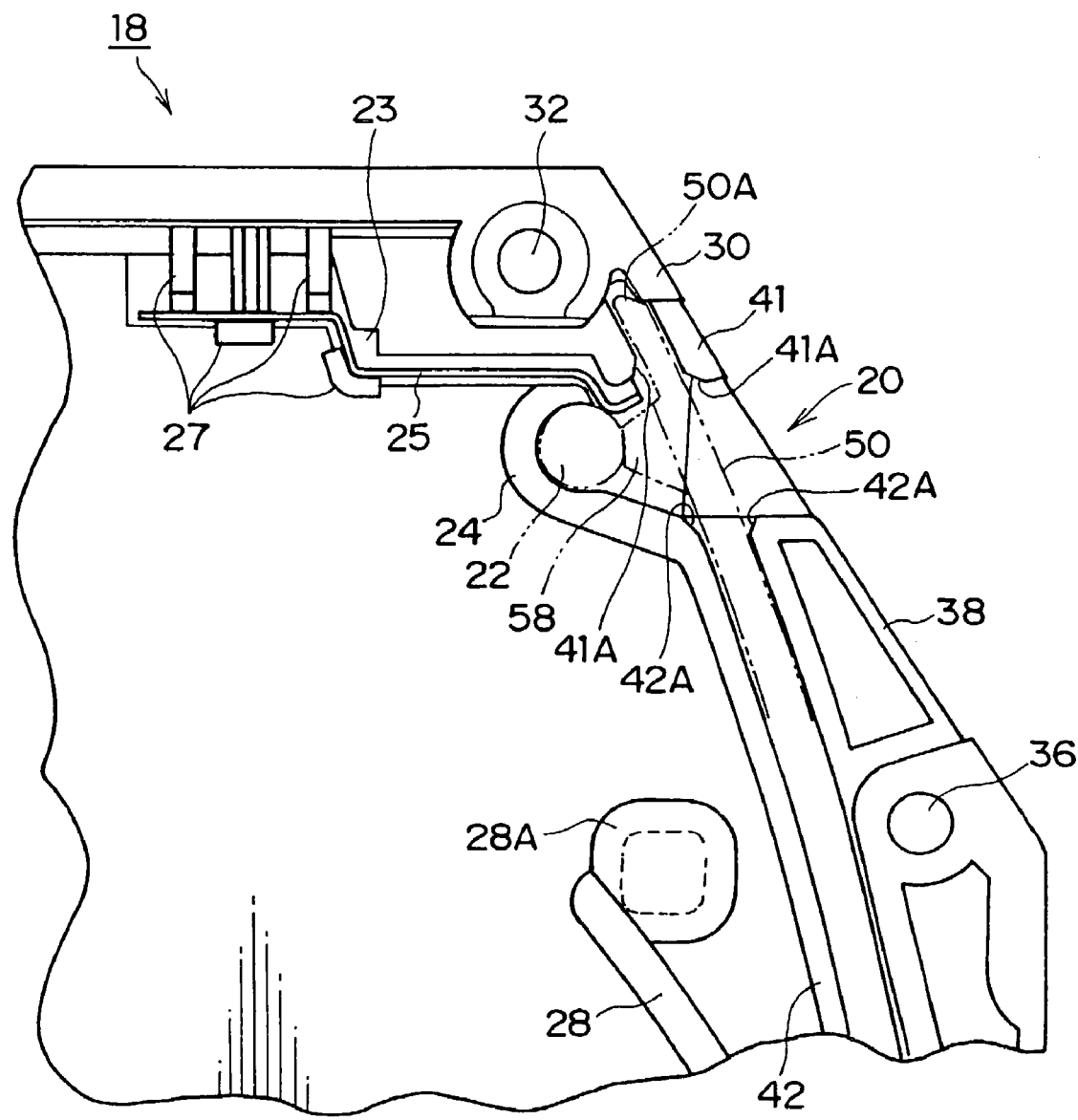
FIG. 5 is a schematic enlarged plan view showing a condition of an opening vicinity of the lower case.
Figure 6A:
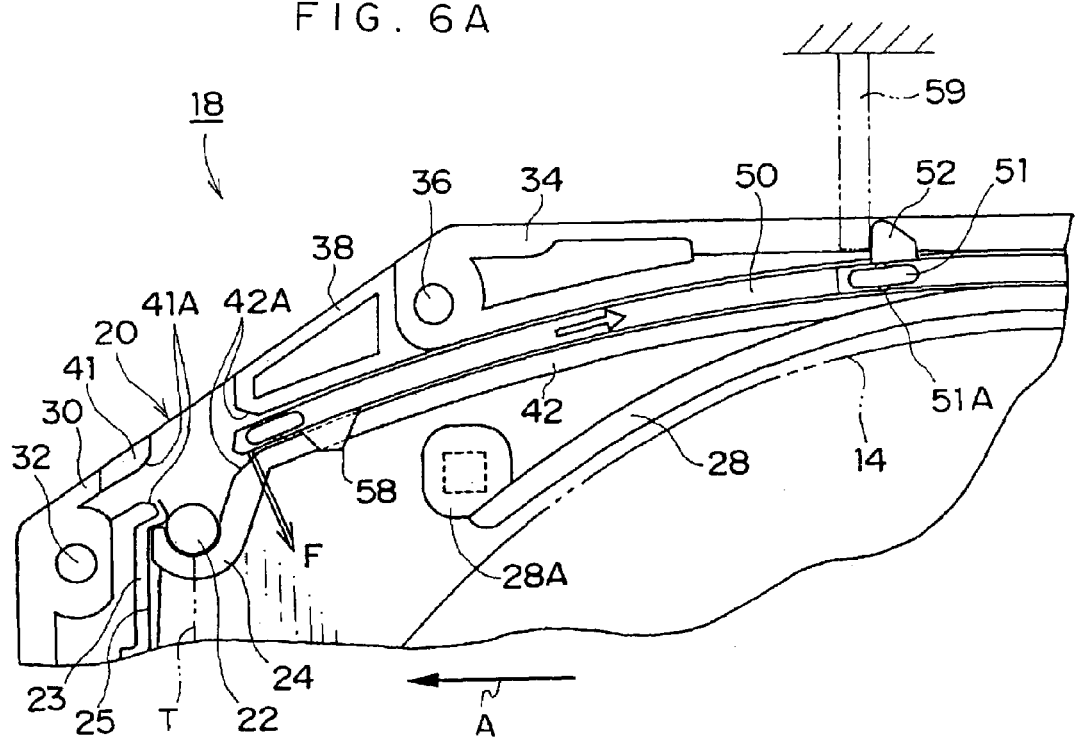
FIG. 6A is a schematic explanatory view showing an opening process of a door.
Figure 6B:
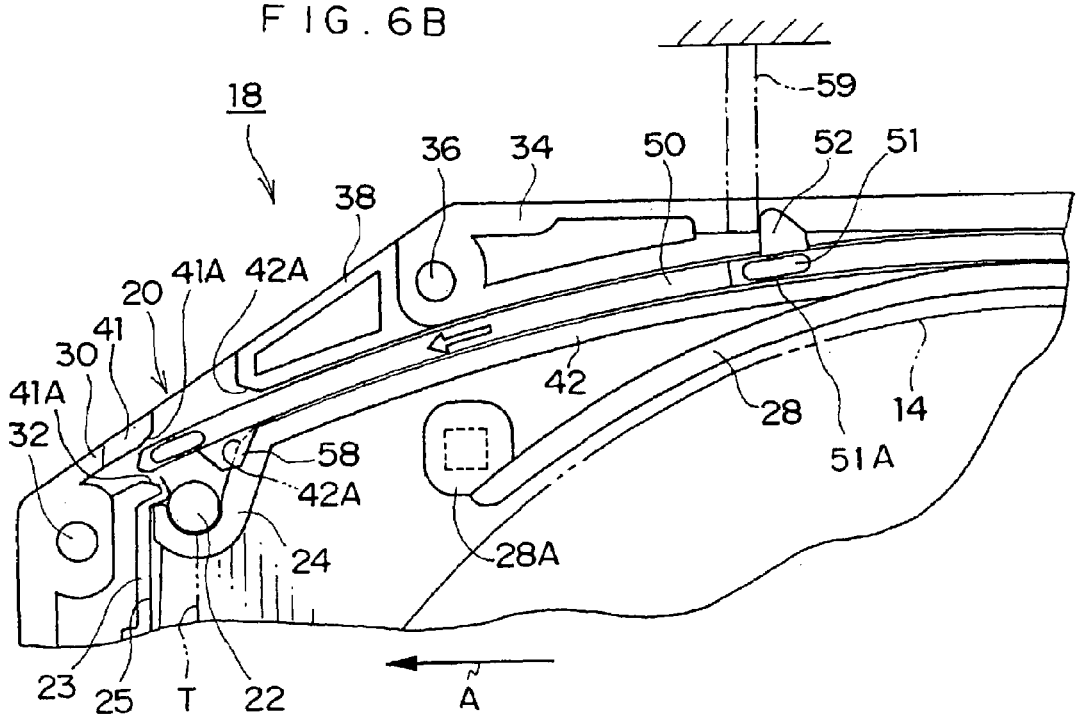
FIG. 6B is a schematic explanatory view showing a closing process of the door.
Figure 8:
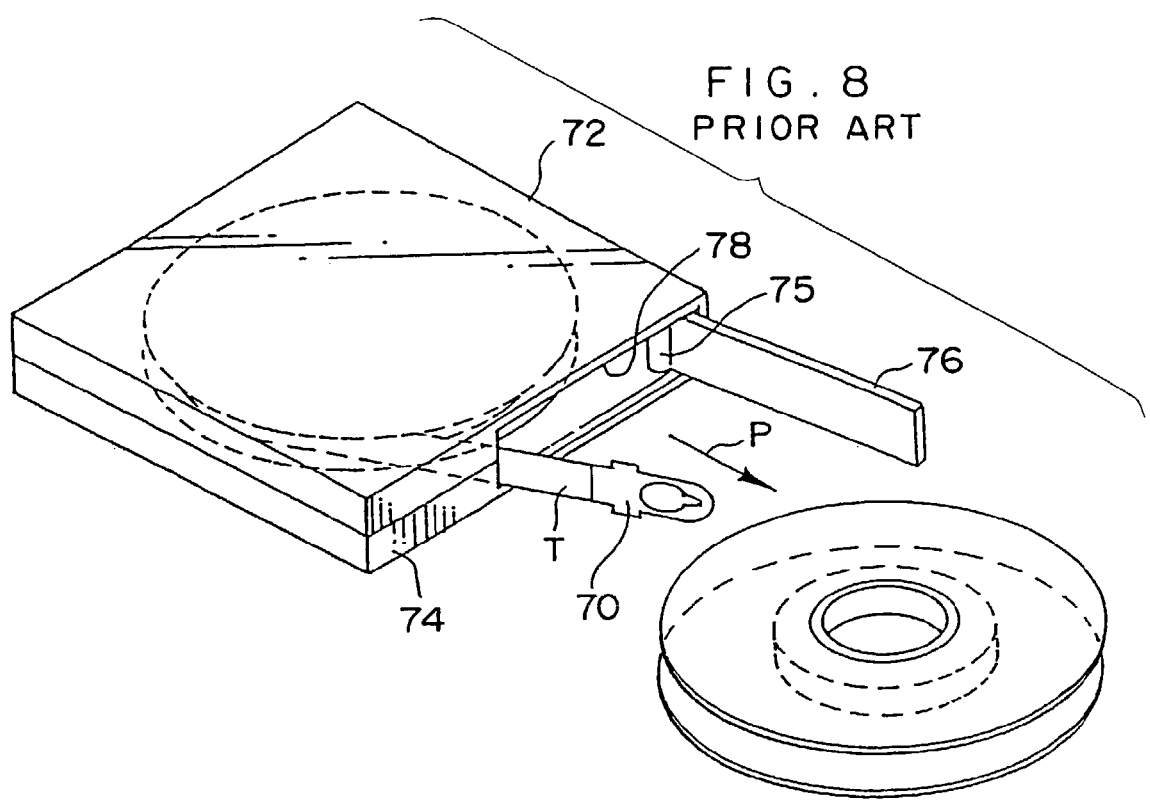
FIG. 8 is a schematic perspective view of a conventional magnetic tape cartridge provided with a leader tape.
Figure 9:
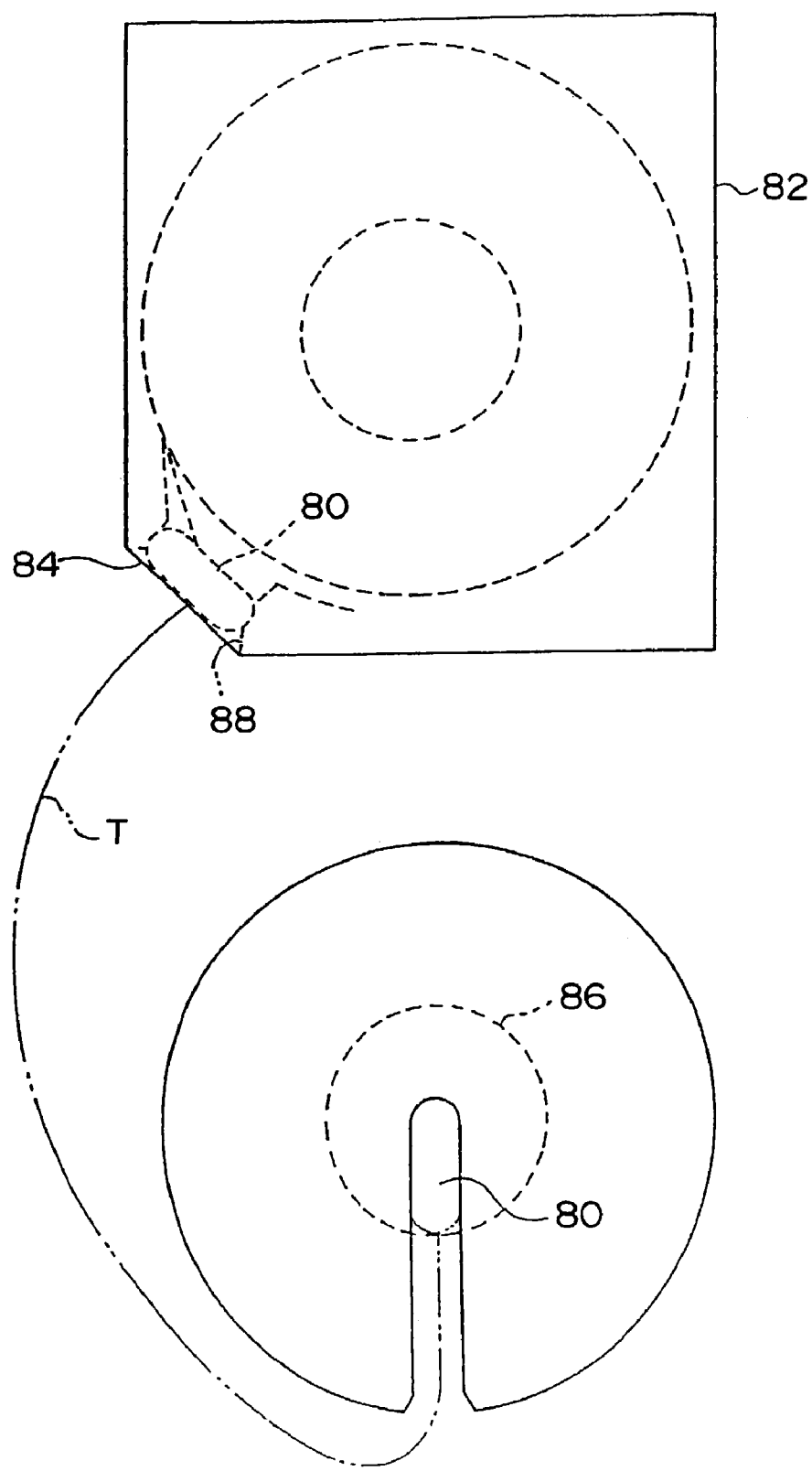
FIG. 9 is a schematic plan view of a conventional magnetic tape cartridge provided with a leader block.

Further still, as shown in FIGS. 5, 6A and 6B, taper surfaces 41A and 42A are respectively formed to be chamfered at the guide wall portions 41 and the front half of the guide wall portions 42, at end portions thereof facing the exit/entry apertures of the pin retention portions 24, at inner face sides thereof corresponding to the door 50. The purpose of these taper surfaces 41A and 42A is to avoid hindering the door 50 when the opening 20 is being opened or closed. The taper surfaces 41A and 42A are formed, at angles of inclination of around 30° to 45°, at at least three locations: the inner side guide wall portions 41, the outer side guide wall portions 41, and the inner side guide wall portions 42 (which are at the left side in the drawing of FIG. 5).

The taper surfaces 41A of the guide wall portions 41 act as guide faces for leading in the distal end portion (front end portion) of the door 50 when the opening 20 is being closed. Thus, the distal end portion (front end portion) of the door 50 is smoothly fed in between the guide wall portions 41. Furthermore, when the opening 20 is being opened, the taper surfaces 42A of the guide wall portions 42 act as avoidance faces for preventing an inner peripheral face of the door 50 from scraping against the guide wall portions 42. Consequently, the door 50 slides smoothly in the direction of opening the opening 20. Note that although the taper surfaces 42A are also formed at end portions of the outer side guide wall portions 42 in the drawings, these taper surfaces 42A need not be provided (chamfered), because the door 50 will not be obstructed at these locations.

The upper case 16 and the lower case 18 with the structures described above are fixed (joined) by unillustrated screws which are screwed from the lower side into each of the screw bosses 32 and 36, which are located in vicinities of edge portions of the opening 20. Accordingly, corner portions at both ends of the opening 20, which are defined by free ends of the angled wall portions 30 (the front wall 12A) and the angled wall portions 34 (the right wall 12B) and which tend to be severely affected when impacted against a floor or the like by a fall, are securely fixed. Thus, even if the case 12 is dropped, this structure will not be deformed by the overall weight of the recording tape cartridge 10 or buckled so as to cause mispositioning. Matching-up surfaces of the peripheral walls 16A and 18A (at corner portions at both ends of the opening 20) may be fixed by welding, but fixing with screws is more desirable in consideration of dismantling and recycling.

Thus, the opening 20 is opened and closed by the door 50, which serves as a covering member. The door 50 is formed such that a plate breadth (height) of a portion thereof that slides along the guide wall portions 41 and the front half of the guide wall portions 42 (at least the portion that closes the opening 20) is substantially the same as the opening height of the opening 20, and a further rearward side thereof is formed to be slightly smaller (lower). In addition, the plate length thereof is formed to be significantly greater than an opening width of the opening 20. Thus, in plan view, the door 50 is formed in a substantially circular arc shape, which is curved in the plate thickness direction thereof, such that the door 50 can move along a predetermined circular circumference.

A curved length dimension of the door 50 is determined such that a rear end portion of the door 50 is disposed in a rear-right corner portion (in a vicinity of the recess portion 46) of the case 12, which is rearward relative to the recess portion 48 when the opening 20 is in the closed state. A lower rear portion of the door 50 is cut away at an angle so as to avoid the memory board M, which is inclinedly disposed at the predetermined angle at the rear portion inside wall 18B side of the lower case 18. In addition, it is preferable if an inner face and/or an outer face of the distal end portion (front end portion) of the door 50 is formed to a tapered face, in order that the door 50 can smoothly enter between the guide wall portions 41. In the drawings, a taper surface 50A is formed at the outer face side of the door 50.

The protrusion portions 51 are protrudingly provided at upper and lower faces of the door 50 and respectively abut against guide faces (inner faces which face one another) of the guide wall portions 41 and the guide wall portions 42 and against inner faces of the upper case 16 and the lower case 18 between the guide wall portions 41 and between the guide wall portions 42. The protrusion portions 51 guide the door 50 in an opening-closing direction of the opening 20. These protrusion portions 51 are formed in substantially elliptical shapes in plan view, which are long along the length direction of the door 50. Four of the protrusion portions 51 are provided at the upper face and four of the protrusion portions 51 are provided at the lower face. The protrusion portions 51 are protrudingly provided such that the upper and lower protrusion portions 51 are symmetrical, except for the rearmost protrusion portions 51, and such that heights thereof are substantially equal to heights of the guide wall portions 41 and the guide wall portions 42 (for example, the protrusion portions 51 at a front side relative to a boundary portion at which the plate breadth of the door 50 changes are about 0.5 mm high, and the protrusion portions 51 at a rear side of the same are about 1.5 mm high). The rearmost of the protrusion portions 51 are not vertically symmetrical because the lower rear portion of the door 50 is cut away at an angle.

Distal ends of the protrusion portions 51 are formed so as to be substantially circular arc-shaped in sectional view (side view), and the protrusions 51A are protrudingly provided in substantially circular arc shapes in plan view, substantially triangular shapes in plan view, or the like, at faces at both sides of the protrusion portions 51 (see FIGS. 6A and 6B).

Consequently, when the protrusion portions 51 are inserted and slid between the guide wall portions 42, only the substantially circular arc-shaped distal ends of the protrusion portions 51 make contact with the inner face of the upper case 16 and the inner face of the lower case 18, which is linear contact. In addition, only the circular arc or the like-shaped distal ends of the protrusions 51A make contact with the mutually opposing guide faces of the guide wall portions 42, which is similarly linear contact.

Accordingly, with this structure, sliding resistance (friction) of the upper and lower protrusion portions 51 with the inner faces of the upper case 16 and lower case 18 between the guide wall portions 41 and between the guide wall portions 42 and with the guide faces of the guide wall portions 41 and 42 can be reduced, and the door 50 can be smoothly slid with less resistance. Furthermore, because the protrusion portions 51 are formed in substantially elliptical shapes in plan view, impact resistance is more excellent than if the protrusion portions 51 were formed in, for example, substantially circular shapes in plan view. Therefore, there is no concern about the protrusion portions 51 being bent if forces in directions other than the opening-closing direction act on the door 50 due to the impact of a fall or the like.

At an outer peripheral surface of the door 50, slightly frontward relative to a longitudinal direction central portion of the door 50 (at a vicinity of the boundary portion at which the plate breadth of the door 50 changes), the operation projection 52 projects along a diametric direction of the door 50, to serve as an operation portion. The operation projection 52 is exposed to the outside of the case 12 through the slit 40. When the opening 20 is in the closed state, the operation projection 52 is disposed to be slightly separated from a rear end of the screw bosses 36, and is operable through the portion of the slit 40 that opens frontward. When the opening 20 is in the opened state, the operation projection 52 is disposed to be slightly separated from the rear edge of the slit 40. At this time, the rearmost of the protrusion portions 51 abut against the rear end portions of the guide wall portions 42.

Stoppers 58, which abut against an upper end portion side face and a lower end portion side face of the leader pin 22 when the opening 20 is closed, are protrudingly provided at the inner face of a front end portion of the door 50. Consequently, detachment of the leader pin 22 from the pin retention portions 24 due to dropping impacts and the like can be more reliably prevented. A coil spring 56, which serves as urging means for urging the door 50 in the direction of closing the opening 20, has a length that reaches as far as the rear-right corner portion of the case 12 in the state in which the door 50 closes the opening 20. Thus, the coil spring 56 is disposed to effectively utilize a space between the free play-restricting walls 28 and the right wall 12B (the peripheral walls 16A and 18A) at the rear-right corner portion.

Specifically, a spring-holding portion 54, which has a substantial L-shape in rear view, is integrally provided protruding at the inner peripheral face of a rear end vicinity of the door 50. A circular column form spring-anchoring portion 55 is provided protruding upward from the inner face of the lower case 18 in a vicinity of the recess portion 48. Ring-like attachment portions 56A and 56B are formed at the coil spring 56, one at each end thereof. Accordingly, the attachment portion 56B at one end of the coil spring 56 is fitted over the spring-anchoring portion 55 from thereabove, and the attachment portion 56A at the other end of the coil spring 56 is fitted over the spring-holding portion 54 from thereabove. Thus, the coil spring 56 can be attached in the space mentioned above with ease.

A rib 57, which slidingly contacts an upper end of the spring-holding portion 54 when the door 50 is opening or closing, is provided standing in a substantially circular arc form, in plan view, at the upper case 16. The rib 57 is provided with location and length so as to slidingly contact the upper end of the spring-holding portion 54 at least when the door 50 starts to move (for opening). Because the rib 57 suitably guides the spring-holding portion 54, which is moving against urging force of the coil spring 56, the door 50 opens more stably (i.e., the door 50 is not caused to vibrate by the urging force of the coil spring 56 while opening).

Moreover, even if an impact due to falling or the like acts on the case 12 and the attachment portion 56A of the coil spring 56 rises up along the spring-holding portion 54, because this rib 57 is provided, the attachment portion 56A can be prevented from detaching from the spring-holding portion 54. Further, an upper end of the spring-anchoring portion 55 is inserted between the free play-restricting wall 28 of the upper case 16 and the guide wall portions 42. Thus, the attachment portion 56B can be similarly prevented from detaching from the spring-anchoring portion 55.

The door 50 described above closes the opening 20 in a state in which the distal end portion of the door 50 enters in between the guide wall portions 41. A drive device side opening/closing member 59 (see FIGS. 6A and 6B) applies a pushing force to the operation projection 52 in a relatively rearward direction (a direction opposite to the direction of arrow A). Consequently, the door 50 slidingly moves (turns) substantially rearward along the predetermined circular circumference. In this structure, the opening 20 is completely open when the outer peripheral face of a distal end portion vicinity of the door 50 reaches a vicinity of the screw bosses 36. In accordance therewith, a pushing force from the door 50 acts at end portions of the inner side guide wall portions 42 in the direction of an arrow F shown in FIG. 6A. Because of this pushing force, the inner peripheral face of the door 50 abuts against the end portions of the inner side guide wall portions 42. Accordingly, the inner side guide wall portions 42 are structured with the taper surfaces 42A formed by chamfering at the end portions thereof, such that the inner peripheral face of the door 50 will not scrape thereat.

Obviously, the door 50 closes the opening 20 by slidingly moving (rotating) in a direction opposite to the direction of opening the opening 20. At the time of closing, as shown in FIG. 6B, the door 50 is smoothly fed in between the guide wall portions 41 by the taper surfaces 41A. Further, although the slit 40 for exposing the operation projection 52 communicates between the interior and exterior of the case 12, adherence of dust and the like to the magnetic tape T wound onto the reel 14 is prevented by the slit 40 being constantly substantially closed off by the screw bosses 36 and the door 50, which spans substantially the whole height of the interior of the case 12, and by the free play-restricting walls 28 serving as an inner wall.

The door 50 is curvedly formed in the circular arc form corresponding to the predetermined circular circumference, which is the movement path of the door 50. A position in a left-right direction of a center of rotation thereof in the present embodiment is set to a left end vicinity of the case 12. A position of the same in a front-rear direction is set to a vicinity of the rear end of the slit 40. Therefore, the movement path of the door 50 comes closest to the right wall 12B of the case 12 at the rear end vicinity of the slit 40. The center and radius of rotation of the door 50 can be suitably determined in accordance with positions of front and rear edge portions of the opening 20 (the angled wall portions 30 and the screw bosses 36), which are determined by requirements of a drive device, an angle of the angled opening face of the opening 20, which is determined by requirements of a library apparatus, or the like.

Next, operation of the present embodiment will be described. In the recording tape cartridge 10 having the structure described above, the opening 20 is closed by the door 50 when the recording tape cartridge 10 is not in use (during storage, during transportation, and the like). Specifically, the door 50 is urged in the closing direction of the opening 20 by the urging force of the coil spring 56, and the door 50 closes the opening 20 in the state in which the distal end portion (front end portion) of the door 50 is entered between the guide wall portions 41 in the vicinity of the angled wall portions 30.

In contrast, when the magnetic tape T is to be used, the recording tape cartridge 10 is loaded into a drive device along the direction of arrow A. In accordance with this loading, the opening/closing member 59, which structures opening/closing means of the drive device, advances into the slit 40 which opens frontward, and engages with the operation projection 52 of the door 50. In this state, as the recording tape cartridge 10 (the case 12) is pushed in further, the urging force of the coil spring 56 is opposed by a force of pushing in, and the opening/closing member 59 moves the operation projection 52 rearward (that is, relatively rearward with respect to the case 12 which is being loaded in the direction of arrow A). The opening/closing member 59 projects in a direction intersecting a direction of the insertion of the recording tape cartridge 10.

Accordingly, the protrusion portions 51 of the door 50, at which the operation projection 52 is protrudingly provided, are guided by the guide wall portions 42 and the spring-holding portion 54 is guided by the rib 57, and the door 50 rotates clockwise, in plan view, along the direction of curvature thereof. That is, the door 50 moves substantially rearward so as to swing at the outer side of the pin retention portions 24 and the reel 14 without significantly deviating from the movement path along the shape of the curvature, and thus the door 50 opens the opening 20. Hence, when the case 12 (the recording tape cartridge 10) is loaded to a predetermined depth in the drive device, the opening 20 is completely opened.

At this time, at the end portions of the inner side guide wall portions 42, the pushing force in the direction shown by arrow F (in FIG. 6A) is applied by the door 50. Consequently, there is a possibility that the door 50 might abut and scrape against the end portions of the inner side guide wall portions 42. However, because the taper surfaces 42A are formed by chamfering at these end portions, the disadvantage of the inner peripheral face of the door 50 abutting and scraping thereat is eliminated. As a result, the door 50 can move in the direction of opening the opening 20 smoothly.

In the state in which the opening 20 has been opened in this manner and the recording tape cartridge 10 has been positioned in the drive device, further rotation (substantially rearward movement) of the door 50 is limited, and the drawing-out means of the drive device advances into the case 12 through the opened opening 20. The drawing-out means takes out the leader pin 22, which had been positioned and retained at the pin retention portions 24, and accommodates the leader pin 22 at an unillustrated winding reel. Then, the winding reel and the reel 14 are driven to rotate contemporaneously, and the magnetic tape T is wound around the winding reel while being sequentially drawn out from the case 12. At this time, recording and/or replaying of information is carried out by a recording/replaying head or the like which is disposed along a predetermined tape path.

Subsequently, when the magnetic tape T has been wound back to the reel 14 again and the recording tape cartridge 10 is to be ejected from the drive device, the state of positioning of the recording tape cartridge 10 is released and the recording tape cartridge 10 is moved in the direction opposite to the direction of arrow A by the urging force of the coil spring 56 and/or by an unillustrated ejection mechanism. The protrusion portions 51 of the door 50 are guided at the guide wall portions 42, while the door 50 is rotated in the closing direction of the opening 20 by the urging force of the coil spring 56. At this time, because the taper surfaces 41A are formed to be chamfered at the end portions of the guide wall portions 41, the distal end portion (front end portion) of the door 50 can enter in between the guide wall portions 41 smoothly. Hence, the door 50 returns to the initial state in which the opening 20 is completely closed.

Here, because the opening 20 has the form of the loading side front-right corner portion of the rectangular case 12 having been cut away, the opening face of the opening 20 faces in the direction of arrow A and in the direction of arrow B (i.e., the opening face is angled with respect to the direction of arrow A). Consequently, the drawing-out means (hooks or the like) of the drive device can gain access and chuck the leader pin 22 from the direction of arrow A, the direction of arrow B, or a direction between the direction of arrow A and the direction of arrow B. Thus, a direction in which a path for drawing out the magnetic tape T can be made as short as possible (the direction of arrow A) can be selected.

That is, a range from which the leader pin 22 can be chucked is broadened. Accordingly, locations at which the pin retention portions 24 can be disposed are broadened and, because positions for disposing the pin retention portions 24 can be specified in accordance with specifications of a drive device that chucks the leader pin 22 from the direction of arrow A, degrees of freedom of design of the drive device and the recording tape cartridge 10 can be broadened. Furthermore, because a mechanism for turning around the drawing-out means is not required, a more compact drive device with lower costs can be designed. Further still, when the length of the path for drawing out the magnetic tape T is minimized thus, a running path of the magnetic tape T will inevitably be shortened too. Therefore, contact friction of the magnetic tape T with tape guides (for example, rotatably supported rollers and the like) can be reduced.

The door 50, which is curvedly formed in the circular arc shape, rotates to open and close the opening 20 by swinging around the outer side of the reel 14 and the pin retention portions 24 (and the leader pin 22) without deviating from the movement path along the shape of the curvature (a path substantially along an outer periphery portion of the reel 14). Thus, a space-saving structure is possible, space in the case 12 can be utilized more efficiently, a space for accommodation of the recording tape cartridge 10 at the drive device can be made smaller, the drive device can be made smaller, and space inside the drive device can be utilized more efficiently.

Because of this door 50, the opening 20 can be designed to be larger. That is, because the center of rotation of the door 50 for opening and closing the opening 20, whose opening face is angled with respect to the direction of arrow A, is determined independently from the position of a center of rotation of the reel 14, the angle of the opening face of the opening 20 with respect to the direction of arrow A, the size of the opening 20 (a distance between front and rear edge portions thereof) and the like can be specified arbitrarily. Thus, the door 50 for opening and closing the opening 20 can be provided with freely selected dimensions and shapes in accordance with requirements of the drive device and the like. That is, a degree of freedom of design of the opening 20 in a structure provided with the door 50 (the recording tape cartridge 10) is improved.

Further yet, because it is sufficient that the opening/closing member 59 of the drive device simply advances into the slit 40 from frontward thereof and is fixedly disposed to be engageable with the operation projection 52 of the door 50, structure thereof can be simple. Also, because the door 50 closes the opening 20 due to the urging force of the coil spring 56, there is no need for a drive device side mechanism for driving the door 50 in the direction of closing the opening 20. Thus, structure of the opening/closing means of the drive device can be even simpler.

As described above, with the recording tape cartridge 10 relating to the present embodiment, the opening 20, which has a structure capable of minimizing the length of the drawing-out path of the magnetic tape T, can be opened and closed by the door 50, which is capable of reducing the size of the accommodation space of the recording tape cartridge 10 in the drive device, without the door 50 interfering with the reel 14 and the leader pin 22, and the opening/closing means (including the opening/closing member 59) which operates the door 50 can be given a simple structure.

Further, the door 50 moves to open and close the opening 20 in a state in which the protrusion portions 51, which are substantially elliptical in plan view, are supported at the guide wall portions 42 which are protrudingly provided at the inner faces of the case 12, rather than in structures which are recessed into the inner faces of the case 12. Therefore, rigidity of the case 12 is not compromised. In addition, because the taper surfaces 41A and 42A are formed to be beveled at the end portions of the guide wall portions 41 and 42 that face the pin retention portions 24, the door 50 can move to open and close smoothly without being hindered by these end portions.

According to the present invention hereabove, because an opening aperture is provided by cutting away a corner portion at a side of loading a case into a drive device, an opening face of this opening aperture can be made to face toward the drive device, drive device side drawing-out means can be advanced into the case from frontward thereof, and a drawing-out path of a recording tape can be made as short as possible. Therefore, a complicated mechanism for turning and guiding the recording tape is not required at the drive device, and a compact drive device with low production costs can be designed.

Moreover, because groove wall end portions of guide grooves that face an exit/entry opening for a leader member are chamfered, when a covering member moves on a predetermined circular circumference to open and close the opening aperture, problems with the covering member being hindered at these groove wall end portions do not occur.

What is claimed is:

1. A tape cartridge which is insertable at a tape drive, the tape drive being provided with an opening member which is operably engageable with the tape cartridge at a time of insertion of the tape cartridge and carrying out at least one of reading and writing of data, the tape cartridge comprising:
    a case housing a reel of tape;
    a tape access opening formed in the case;
    a covering member which is reciprocally moveable along
        a circular arc-form movement path between a closed position for closing the tape access opening and an open position for opening the tape access opening; and
    a plurality of guide portions for guiding the reciprocal movement of the covering member,
    wherein part of the plurality of guide portions is cut away to form a cut-out portion, through which a leader member attached to an end portion of tape can move in and out of the cartridge, and
    chamfering is applied to form a taper surface at an end portion at the cut-out portion of at least one guide portion of the plurality of guide portions, which end portion faces the tape access opening, for smooth guiding of the covering member,
    wherein the end portion is provided at the tape access opening.

2. The tape cartridge of claim 1, further comprising a reel on which tape is unwindably wound, the reel being rotatably disposed in the case.

3. The tape cartridge of claim 1, wherein the case appears substantially rectangular in plan view.

4. The tape cartridge of claim 1, wherein the case comprises a front wall portion facing in a direction of the insertion of the cartridge, a side wall portion substantially parallel to the cartridge insertion direction, and an angled wall portion connected with the front wall portion and the side wall portion and angled relative to the cartridge insertion direction,
    and wherein the tape access opening is formed in the angled wall portion of the case.

5. The tape cartridge of claim 1, wherein the leader member is releasably retained at a vicinity of the tape access opening.

6. The tape cartridge of claim 1, further comprising an urging element which continuously urges the covering member in a direction toward the closed position.

7. The tape cartridge of claim 1, wherein an end of the covering member at a tape access opening side thereof comprises a taper surface at which chamfering is applied for smooth movement of the covering member.

8. The tape cartridge of claim 1, further comprising an operation portion provided at the covering member, the operation portion being capable of moving the covering member in a direction toward the open position while engaged with the opening member of the tape drive by an operation of the insertion of the tape cartridge.

9. The tape cartridge of claim 8, wherein the case comprises a window portion which enables relative engagement of the opening member of the tape drive and the operation portion at the time of insertion of the tape cartridge.

10. The tape cartridge of claim 1, wherein the case is structured with an upper case and a lower case, and includes a plurality of joining portions for joining the upper case and the lower case.

11. A tape drive for carrying out at least one of reading and writing of data at a tape cartridge which is insertable at the tape drive, wherein the tape cartridge includes:
    a case housing a reel of tape;
    a tape access opening formed in the case;
    a covering member which is reciprocally moveable along
        a circular arc-form movement path between a closed position for closing the tape access opening and an open position for opening the tape access opening; and
    a plurality of guide portions for guiding the reciprocal movement of the covering member, chamfering being applied to form a taper surface at an end portion of at least one guide portion of the plurality of guide portions, which end portion faces the tape access opening, for smooth guiding of the covering member, wherein the tape drive includes an opening member which is capable of operably engaging with the tape cartridge at a time of insertion of the tape cartridge, and wherein the end portion is provided at the tape access opening.

12. The tape drive of claim 11, wherein the opening member is capable of engaging with the covering member and moving the covering member in a direction toward the open position at the tape cartridge insertion time.

13. The tape drive of claim 11, wherein the opening member projects in a direction intersecting a direction of the insertion of the tape cartridge.

14. The tape drive of claim 11, wherein the opening member advances into the tape cartridge at the tape cartridge insertion time.

15. The tape drive of claim 14, wherein the opening member advances through a tape cartridge window portion formed in the tape cartridge.

16. A tape cartridge which is insertable at a tape drive, the tape drive being provided with an opening member which is operably engageable with the tape cartridge at a time of insertion of the tape cartridge and carrying out at least one of reading and writing of data, the tape cartridge comprising:
a case;
a tape access opening formed in the case;
a covering member which is reciprocally moveable along a circular arc-form movement path between a closed position for closing the tape access opening and an open position for opening the tape access opening;
a plurality of guide portions for guiding the reciprocal movement of the covering member,
wherein part of the plurality of guide portions is cut away to form a cut-out portion through which a leader member attached to an end portion of tape can move in and out of the cartridge,
wherein chamfering is applied to form a taper surface at an end portion at the cut-out portion of at least one guide portion of the plurality of guide portions, which end portion faces the tape access opening, for smooth guiding of the covering member, and
wherein the chamfering applied at the end portion of the at least one guide portion of the plurality of guide portions is in a vicinity of an intersection of the circular arc-form movement path of the covering member and a movement path of the leader member.

17. The tape cartridge of claim 16, wherein the end portion is provided at the tape access opening.

18. The tape cartridge of claim 16, wherein the case comprises a front wall portion facing in a direction of the insertion of the cartridge, a side wall portion substantially parallel to the cartridge insertion direction, and an angled wall portion connected with the front wall portion and the side wall portion and angled relative to the cartridge insertion direction,
and wherein the tape access opening is formed in the angled wall portion of the case.

19. A tape drive for carrying out at least one of reading and writing of data at a tape cartridge which is insertable at the tape drive, wherein the tape cartridge includes:
a case housing a reel of tape;
a tape access opening formed in the case;
a covering member which is reciprocally moveable along a circular arc-form movement path between a closed position for closing the tape access opening and an open position for opening the tape access opening; and
a plurality of guide portions for guiding the reciprocal movement of the covering member, chamfering being applied to form a taper surface at an end portion of at least one guide portion of the plurality of guide portions, which end portion faces the tape access opening, for smooth guiding of the covering member, and
wherein the tape drive includes an opening member which is capable of operably engaging with the tape cartridge at a time of insertion of the tape cartridge,
wherein the tape cartridge further includes a leader member attached to an end portion of a tape, wherein the leader member is releasably retained at a vicinity of the tape access opening, and the chamfering applied at the end portion of the at least one guide portion of the plurality of guide portions is in the vicinity of an intersection of the circular arc-form movement path of the covering member and a movement path of the leader member.

20. The tape drive of claim 19, wherein the end portion is provided at the tape access opening.

21. The tape drive of claim 19, wherein the case comprises a front wall portion facing in a direction of the insertion of the cartridge, a side wall portion substantially parallel to the cartridge insertion direction, and an angled wall portion connected with the front wall portion and the side wall portion and angled relative to the cartridge insertion direction,
and wherein the tape access opening is formed in the angled wall portion of the case.

\* \* \* \* \*